US010173228B1

(12) United States Patent
Lin et al.

(10) Patent No.: US 10,173,228 B1
(45) Date of Patent: Jan. 8, 2019

(54) FLOW-ADJUSTABLE SHOWER UNIT

(71) Applicant: Kylin Sanitary Technology (Xiamen) Co., Ltd., Xiamen (CN)

(72) Inventors: Yi Long Lin, Xiamen (CN); You Hui Lan, Xiamen (CN); Hai Huang Xiao, Xiamen (CN); Hui Huang, Xiamen (CN); Qing Shuang Li, Xiamen (CN)

(73) Assignee: KYLIN SANITARY TECHNOLOGY (XIAMEN) CO., LTD., Xiamen, Fujian Province (CN)

( * ) Notice: Subject to any disclaimer, the term of this patent is extended or adjusted under 35 U.S.C. 154(b) by 0 days.

(21) Appl. No.: 15/783,774

(22) Filed: Oct. 13, 2017

(30) Foreign Application Priority Data

Jul. 10, 2017 (CN) .................... 2017 2 0830996 U

(51) Int. Cl.

| | |
|---|---|
| ***B05B 1/16*** | (2006.01) |
| ***B05B 1/18*** | (2006.01) |
| ***B05B 1/30*** | (2006.01) |
| ***E03C 1/02*** | (2006.01) |
| ***F16K 31/53*** | (2006.01) |
| ***F16K 31/60*** | (2006.01) |
| ***E03C 1/04*** | (2006.01) |

(52) U.S. Cl.
CPC ............ *B05B 1/185* (2013.01); *B05B 1/3026* (2013.01); *E03C 1/0408* (2013.01); *E03C 2001/026* (2013.01)

(58) Field of Classification Search
CPC ....... B05B 1/16; B05B 1/1627; B05B 1/1636; B05B 1/169; B05B 1/18; B05B 1/185; B05B 1/3026; E03C 1/0408; E03C 2001/026; F16K 31/53; F16K 31/535; F16K 31/60; F16K 31/602
See application file for complete search history.

(56) References Cited

U.S. PATENT DOCUMENTS 4,530,467 A * 7/1985 Bueno .................. B05B 1/1636 239/407
4,629,125 A * 12/1986 Liu ...................... B05B 1/1636 239/383
2013/0025722 A1* 1/2013 Zhou ........................ B05B 1/18 137/625
2014/0027234 A1* 1/2014 Zhou .................... B05B 1/1636 192/43.1

* cited by examiner

*Primary Examiner* — Darren W Gorman
(74) *Attorney, Agent, or Firm* — Muncy, Geissler, Olds & Lowe, P.C.

(57) ABSTRACT

A flow-adjustable shower unit comprises a water path connector, a water outlet assembly, and a connecting base arranged between the water path connector and the water outlet assembly to make the water path connector communicate with the water outlet assembly; the connecting base is a cylindrical cavity, a fixed baffle transversely dividing the cavity of the connecting base is arranged in the connecting base, and a first through groove is formed in the fixed baffle in a penetrating mode; a movable baffle is further movably mounted on the connecting base and abuts against the fixed baffle, and a second through groove is formed in the position, corresponding to the first through groove, of the movable baffle; the overlapping area between the first through groove and the second through groove can be adjusted by adjusting the position of the movable baffle, and thus the flow of the connecting base is adjusted.

6 Claims, 9 Drawing Sheets

FLOW-ADJUSTABLE SHOWER UNIT

BACKGROUND OF THE INVENTION

Technical Field

The invention belongs to the technical field of bathroom equipment, and particularly relates to a flow-adjustable shower unit.

Description of Related Art

At present, both family living and hotel environments are multi-storey high-rise buildings, and water pressures on different storeys are different due to the restriction of water supply modes.

In the use of shower units, conventional techniques do not have a throttling device for convenient adjustment, the water outflow rates on different storeys are different, the user experience of customers is poor, and water waste or water deficiency can be caused extremely easily.

BRIEF SUMMARY OF THE INVENTION

To solve the problem that the flow cannot be adjusted properly according to the water pressure in the use of an existing shower unit, the invention aims to provide a flow-adjustable shower unit.

The specific scheme is as follows: a flow-adjustable shower unit comprises a water path connector and a water outlet assembly and is characterized by further comprising a connecting base, wherein the connecting base is arranged between the water path connector and the water outlet assembly to make the water path connector communicate with the water outlet assembly; the connecting base is a cylindrical cavity, a fixed baffle transversely dividing the cavity of the connecting base is arranged in the connecting base, and a first through groove is formed in the fixed baffle in a penetrating mode; a movable baffle is further movably mounted on the connecting base and abuts against the fixed baffle, and a second through groove is further formed in the position, corresponding to the first through groove, of the movable baffle; the overlapping area between the first through groove and the second through groove can be adjusted by adjusting the position of the movable baffle, and thus the flow of the connecting base is adjusted.

Furthermore, a rotary shaft is further arranged at the center of the movable baffle, the rotary shaft is rotatably mounted in the connecting base, and the movable baffle rotates relative to the connecting base through the rotary shaft so as to be rotatably adjusted relative to the fixed baffle.

Furthermore, the flow-adjustable shower unit comprises a shifting part extending out of the connecting base, the rotary shaft is mounted in the connecting base, and the shifting part is arranged on the rotary shaft in a sleeving mode so that the movable baffle can be rotated.

Furthermore, the flow-adjustable shower unit comprises a housing, the housing is provided with a mounting cavity with both ends open, and the water path connector and the water outlet assembly are arranged at the two ends of the mounting cavity of the housing respectively; the connecting base is arranged in the mounting cavity to make the water path connector communicate with the water outlet assembly; an adjusting gear is further arranged in the housing, and the adjusting gear is engaged with the shifting part so that the flow of the connecting base can be adjusted through the adjusting gear.

Furthermore, the flow-adjustable shower unit comprises a reversing assembly; the water outlet assembly is provided with a water distribution body, the water distribution body is provided with two or more flow distribution water paths in different water outlet modes, and a water distribution hole corresponding to each flow distribution water path is formed in the water distribution body; the reversing assembly is connected to the water path connector through the connecting base and provided with a water outlet abutting against the water distribution body; the water distribution body is movably mounted relative to the reversing assembly, and the water outlet can communicate with different water distribution holes by moving and/or rotating the water distribution body relative to the reversing assembly; the water distribution holes of the at least two flow distribution water paths are arranged adjacently so that the water outlet can independently communicate with one water distribution hole or can communicate with the at least two adjacent water distribution holes at the same time, and accordingly water can be sprayed out of any flow distribution water path or be sprayed out of the at least two flow distribution water paths at the same time; a sealing element is further arranged between the reversing assembly and the water distribution holes so that when the water outlet partially overlaps with one water distribution hole, the portion, located beyond the coverage area of the water outlet, of the water distribution hole can be sealed.

Furthermore, the water distribution body comprises a water distribution pan and an upper cover covering the water distribution pan; the flow distribution water paths are arranged on the side, facing the upper cover, of the water distribution pan, and the number of the flow distribution water paths is three; the water distribution holes are formed in the upper cover, the number of the water distribution holes is three, and the three water distribution holes correspondingly communicate with the flow distribution water paths respectively; the water outlet of the reversing assembly can abut against the upper cover so as to communicate with the water distribution holes.

Furthermore, one end of the connecting base communicates with the water path connector, and the other end of the connecting base is connected to the reversing assembly; the reversing assembly is arranged on the connecting base in a sleeving mode so as to communicate with the water path connector through the connecting base.

Furthermore, the reversing assembly is movably connected with the connecting base and can rotate around the connecting base, and all the water distribution holes are located in the arc movement track of the water outlet, so that selection and switching of the flow distribution water paths are achieved.

Furthermore, a round insertion groove is formed in one end of the reversing assembly, and the bottom end of the connecting base is inserted into the insertion groove, so that the reversing assembly is kept communicating with the water path connector in the rotating process; the insertion groove communicates with the water outlet.

According to the invention, the connecting base is arranged, the fixed baffle and the movable baffle are arranged on the connecting base, the first through groove and the second through groove are formed in the fixed baffle and the movable baffle respectively, the overlapping area between the first through groove and the second through groove can be adjusted by adjusting the position of the movable baffle, and thus the flow of the connecting base is adjusted; the technical effect of adjusting the flow of the shower unit properly according to water pressures of different storeys is achieved.

DETAILED DESCRIPTION OF THE INVENTION

Figure 1:
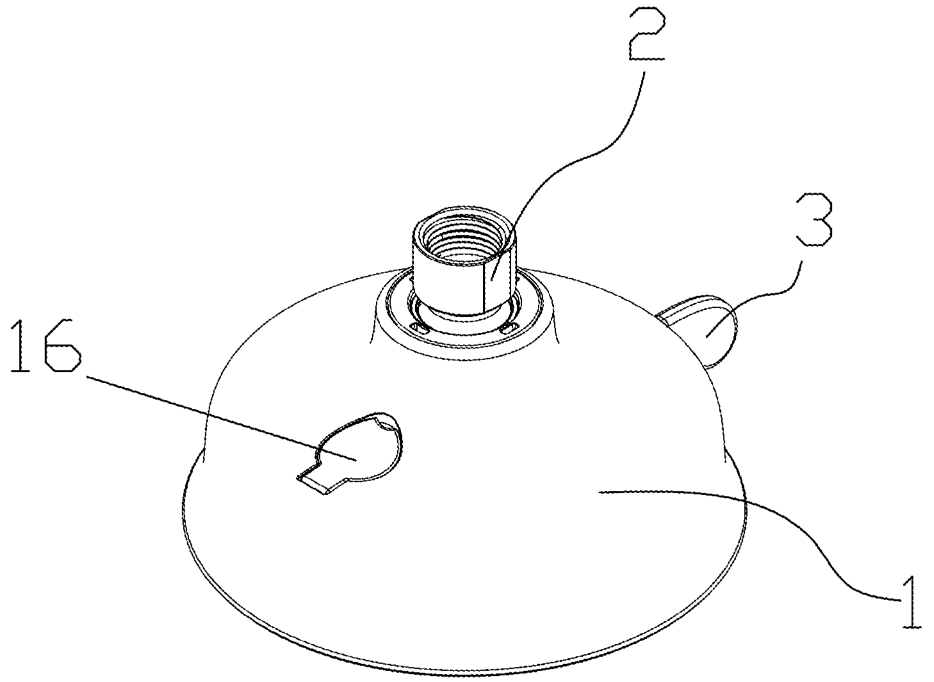
FIG. 1 shows a structural view of an embodiment of the invention.

Drawings are provided by the invention for a further description of all embodiments of the invention. The Drawings are part of the content disclosed by the invention and mainly used for illustrating the embodiments and can explain the operating principle of the embodiments in cooperation with relevant illustration in the description. By referring to the content, those skilled in the field can understand other possible execution modes and advantages of the invention. Components in the drawings are not drawn in proportion, and similar component symbols are generally used for indicating similar components.

A further description of the invention is given with accompanying drawings and specific execution modes.

Figure 2:
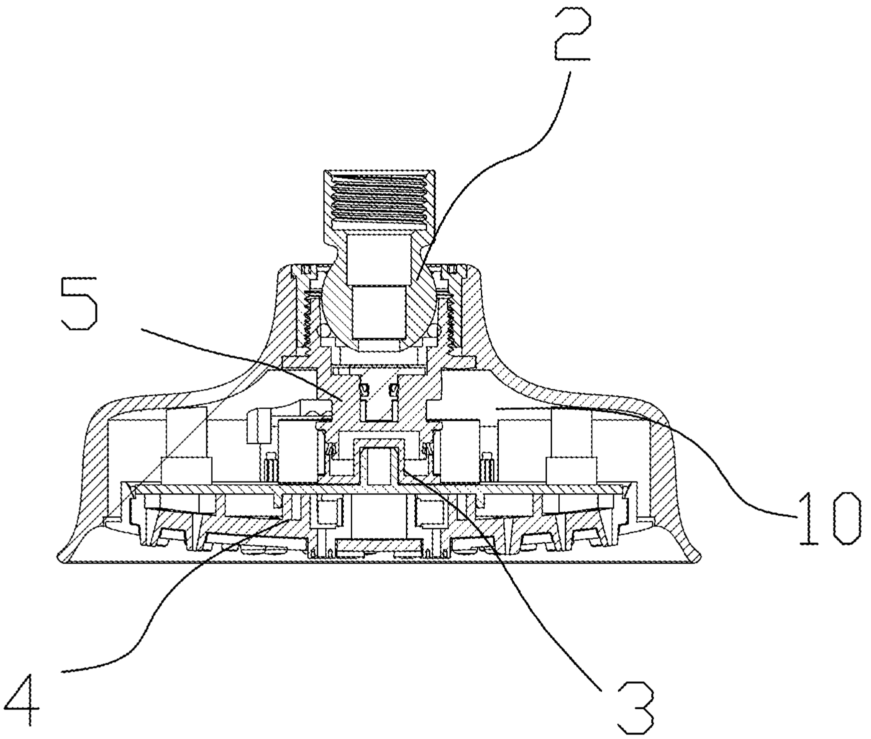
FIG. 2 shows a sectional view of FIG. 1.
Figure 3:
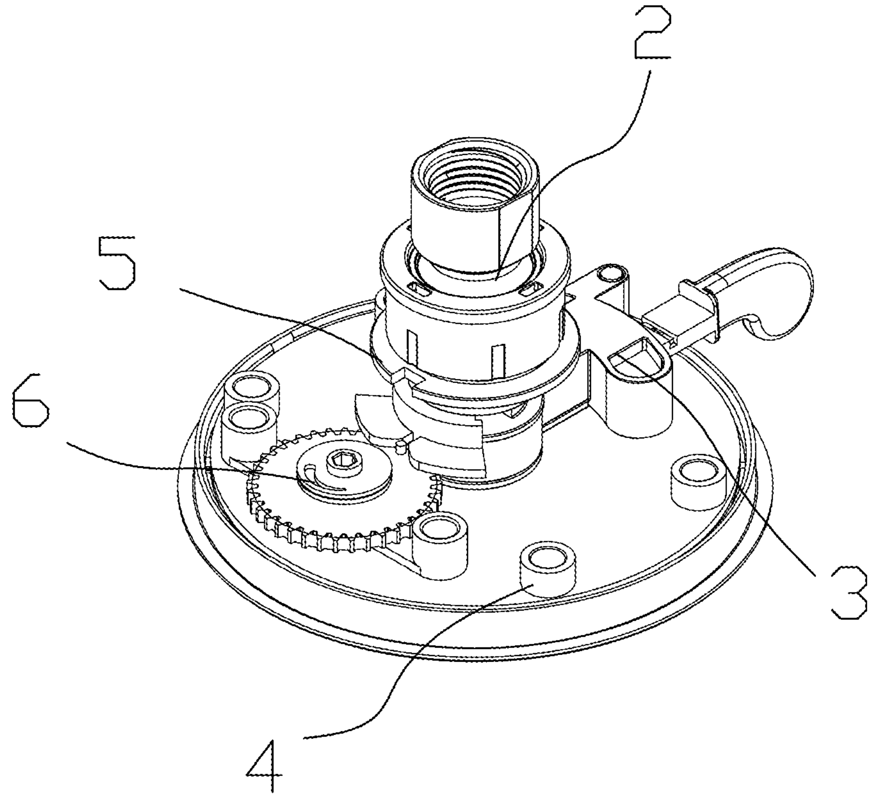
FIG. 3 shows a structural view of FIG. 1 after a housing is removed.
Figure 4:
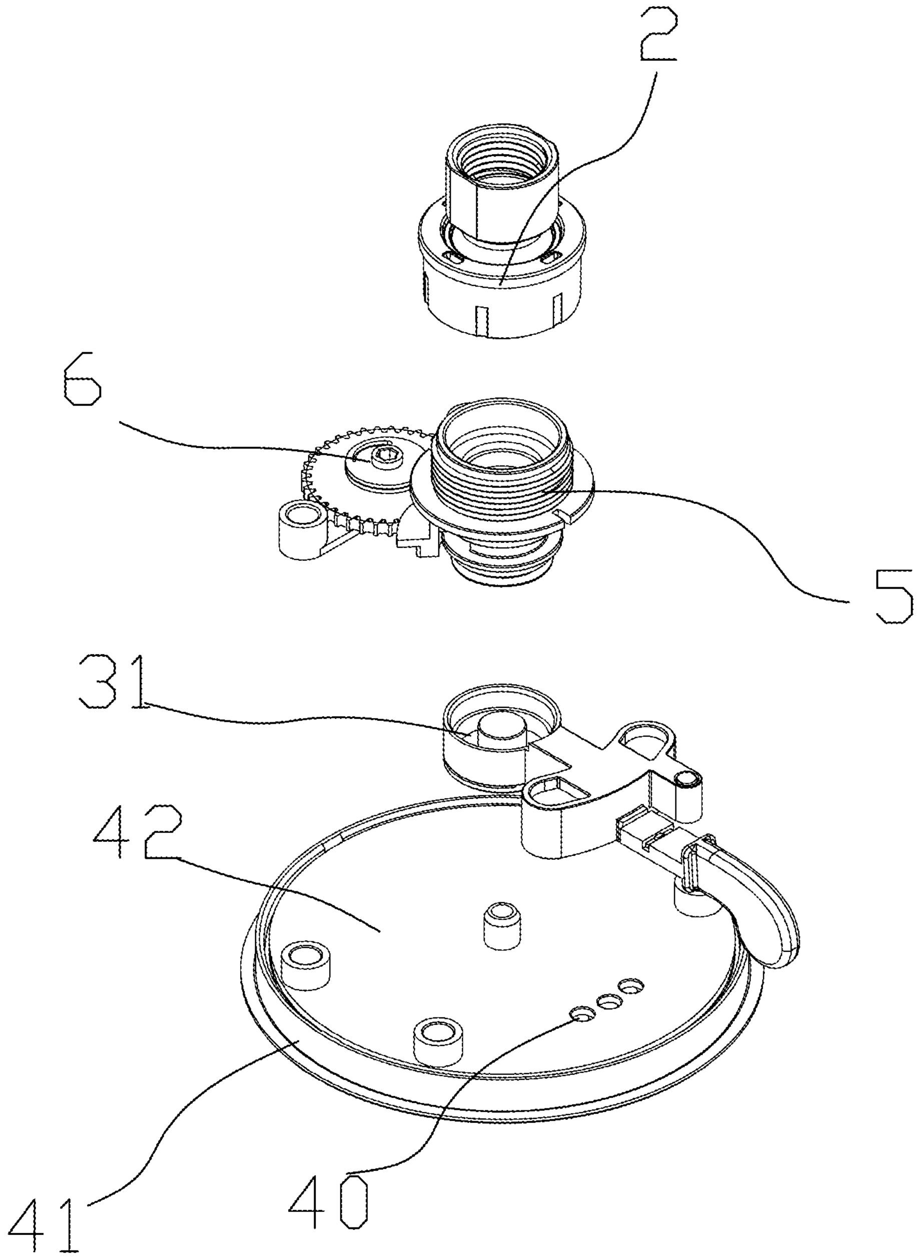
FIG. 4 shows an exploded view of FIG. 3.
Figure 5:
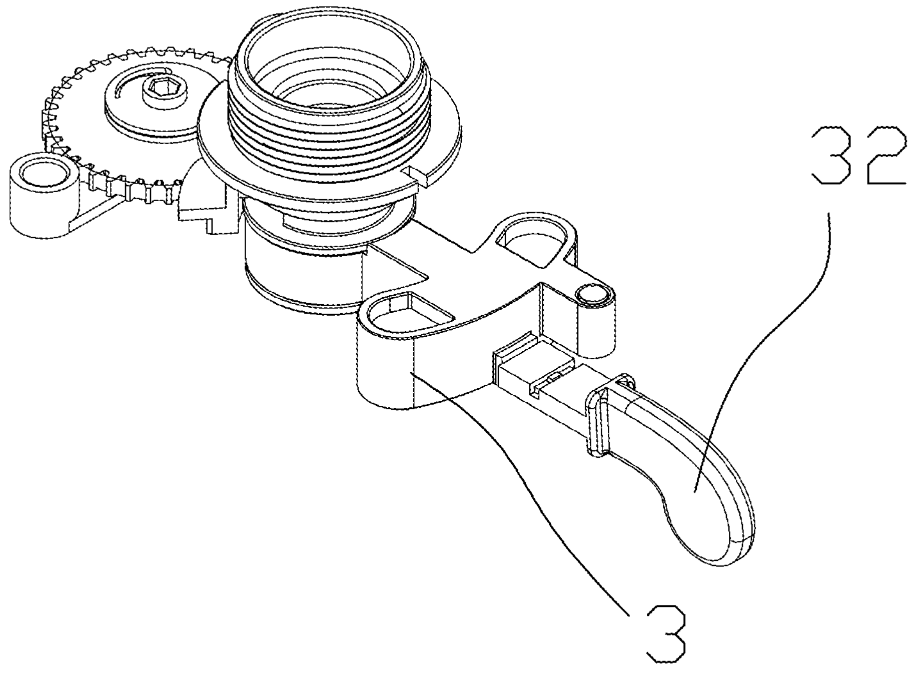
FIG. 5 shows a structural view of FIG. 3 after a water path connector and a water outlet assembly are removed.
Figure 6:
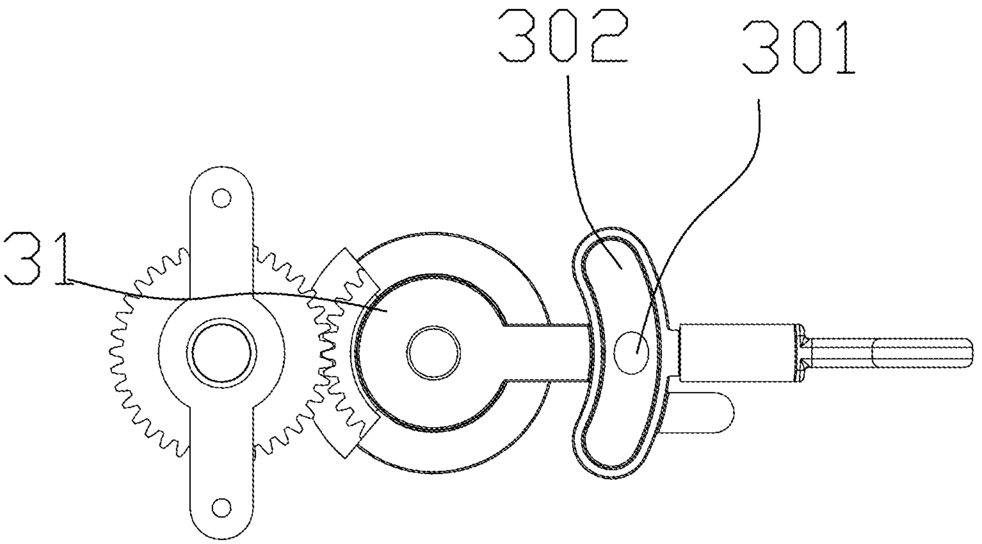
FIG. 6 shows a bottom view of FIG. 5.

As is shown in FIGS. 1-3, a flow-adjustable shower unit is provided by the embodiment and comprises a shower unit housing 1, a water path connector 2, a water outlet assembly 4 and a reversing assembly 3.

The housing 1 is a bowl-shaped hollow housing and is provided with a mounting cavity 10 with both ends open, and the water path connector 2 and the water outlet assembly 4 are arranged at the two open ends of the mounting cavity 10 of the housing 1 respectively; the main body part of the reversing assembly 3 is arranged in the mounting cavity 10 and located between the water path connector 2 and the water outlet assembly 4, so that the water path connector 2 is made to communicate with the water outlet assembly 4.

Figure 7:
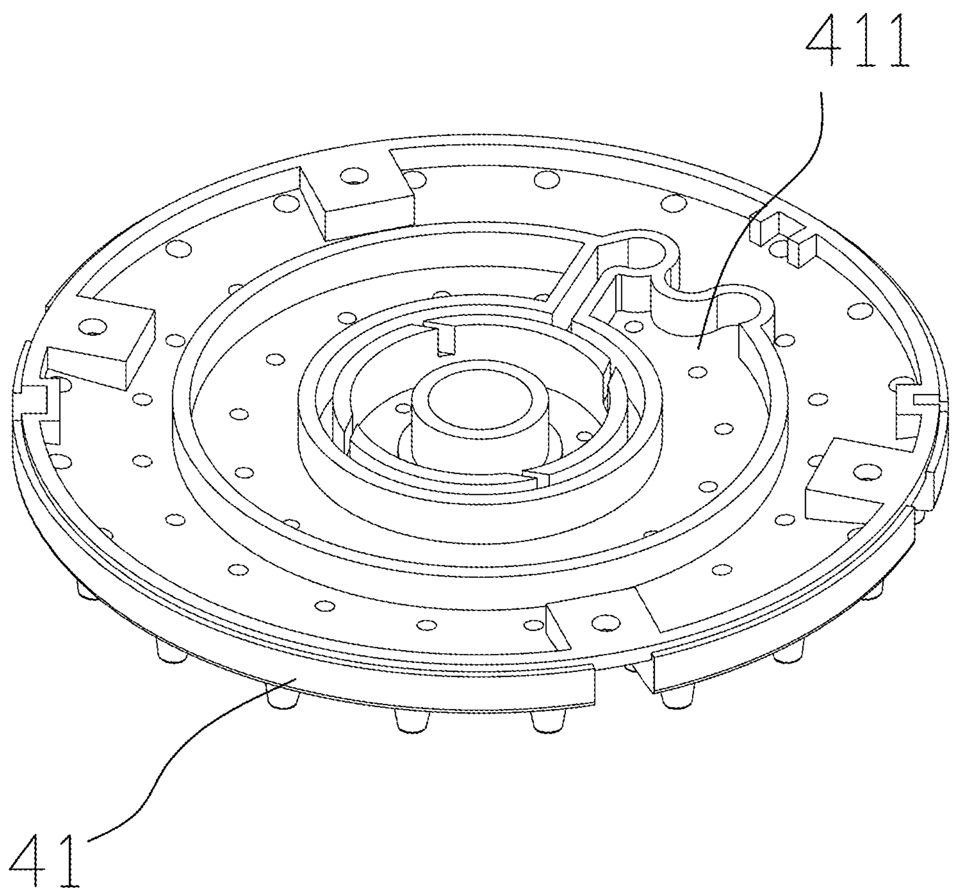
FIG. 7 shows a structural view of a water distribution pan in FIG. 4.

As is shown in FIG. 3 and FIG. 7, in the embodiment, the water outlet assembly 4 is a water distribution body and comprises a water distribution pan 41 and an upper cover 42; three flow distribution water paths 411 are arranged on the upper end face of the water distribution pan 41, and the upper cover 42 covers the water distribution pan 41 and seals the flow distribution water paths 411; a water distribution hole 40 corresponding to each flow distribution water path 411 is formed in the upper cover 42 in a penetrating mode, the number of the water distribution holes 40 is three, each water distribution hole 40 correspondingly communicates with one flow distribution water path 411, and thus two or more flow distribution water paths 411 in different water outlet modes are formed in the water distribution body 4.

As is shown in FIGS. 3-6, a connecting base 5 is further mounted in the housing 1, one end of the connecting base 5 communicates with the water outlet end of the water path connector 2, and the other end of the connecting base 5 is connected to the reversing assembly 3; namely, the reversing assembly 3 is arranged on the connecting base 5 in a sleeving mode so as to communicate with the water path connector 2 through the connecting base 5, a water outlet 301 abutting against the water distribution body 4 is formed in the side, close to the water distribution body 4, of the reversing assembly 3, and the water outlet 301 of the reversing assembly 3 abuts against the wall surface of the upper cover 42.

The reversing assembly 3 is movably connected with the connecting base 5 and can rotate around the connecting base 5 by moving handle 32, specifically, a round insertion groove 31 is formed in one end of the reversing assembly 3, a pipeline is arranged in the reversing assembly 3 to enable the insertion groove 31 to be connected with the water outlet 301, and thus the insertion groove 31 is made to communicate with the water outlet 301. A cylindrical insertion part matched with the insertion groove 31 is arranged at the bottom end of the connecting base 5, the connecting base 5 is inserted in the insertion groove 31 so that the reversing assembly 3 can rotate, and the reversing assembly 3 is kept communicating with the water path connector 2 in the rotating process.

The three water distribution holes 40 are located on the arc movement track of the water outlet 301, every two water distribution holes 40 are adjacent, and the distance between every two adjacent water distribution holes 40 is smaller than the diameter of the water outlet 301; the reversing assembly 3 is rotated around the connecting base 5 to make the water outlet 301 independently communicate with one water distribution hole 40 or to make the water outlet 301 communicate with two adjacent water distribution holes 40 at the same time, and thus water can be sprayed out of any flow distribution water path 411 or be sprayed out of two flow distribution water paths 411 at the same time; in the embodiment, the reversing assembly 3 is further provided with a rubber sealing element 302 around the water outlet 301, the rubber sealing element 302 is an arc-shaped rubber block in the embodiment, and the water outlet 301 is formed in the middle of the sealing element 302, so that when the water outlet 301 is not completely aligned to one water distribution hole 40, the portion, located beyond the coverage area of the water outlet 301, of the water distribution hole 40 can be sealed.

Figure 8:
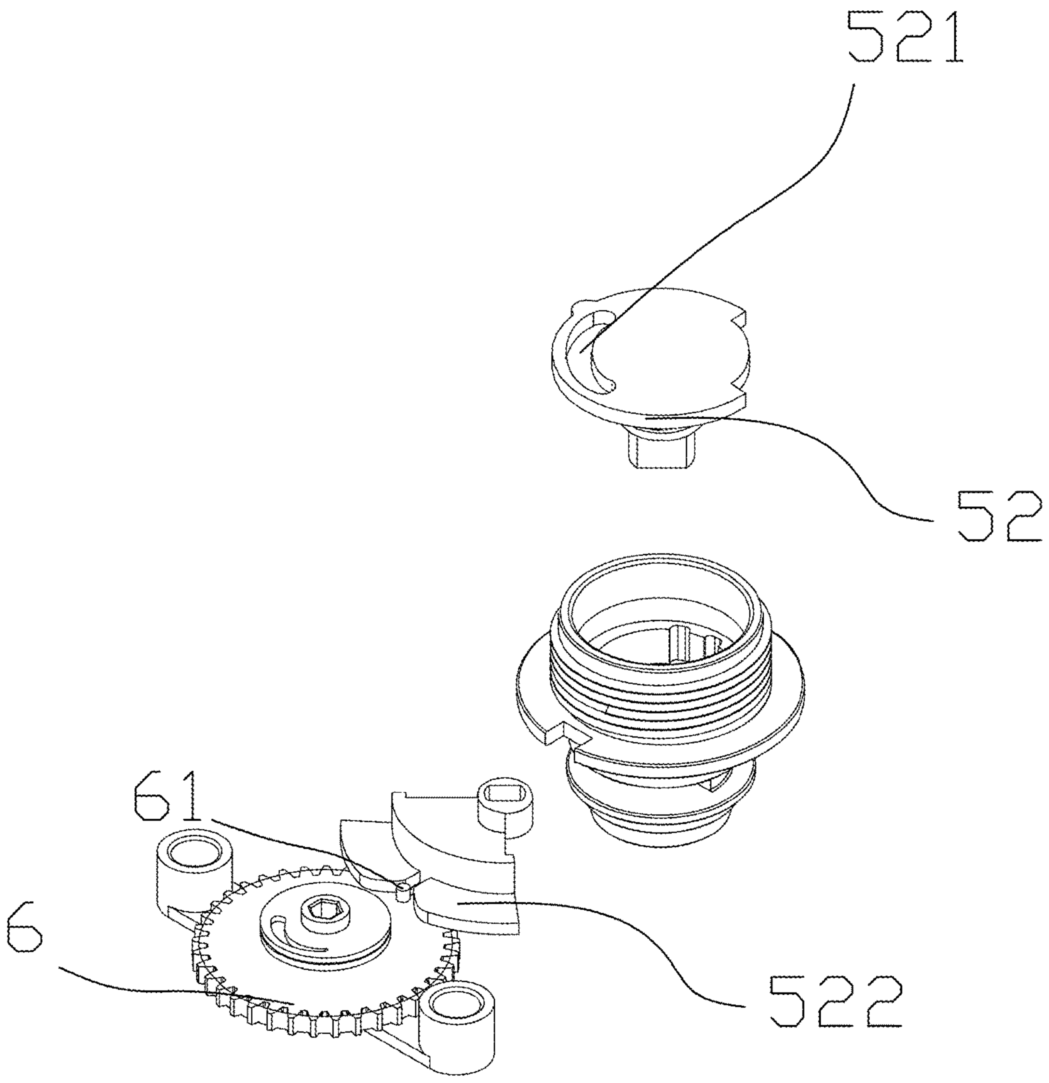
FIG. 8 shows an exploded view of FIG. 5 after a reversing assembly is removed.
Figure 9:
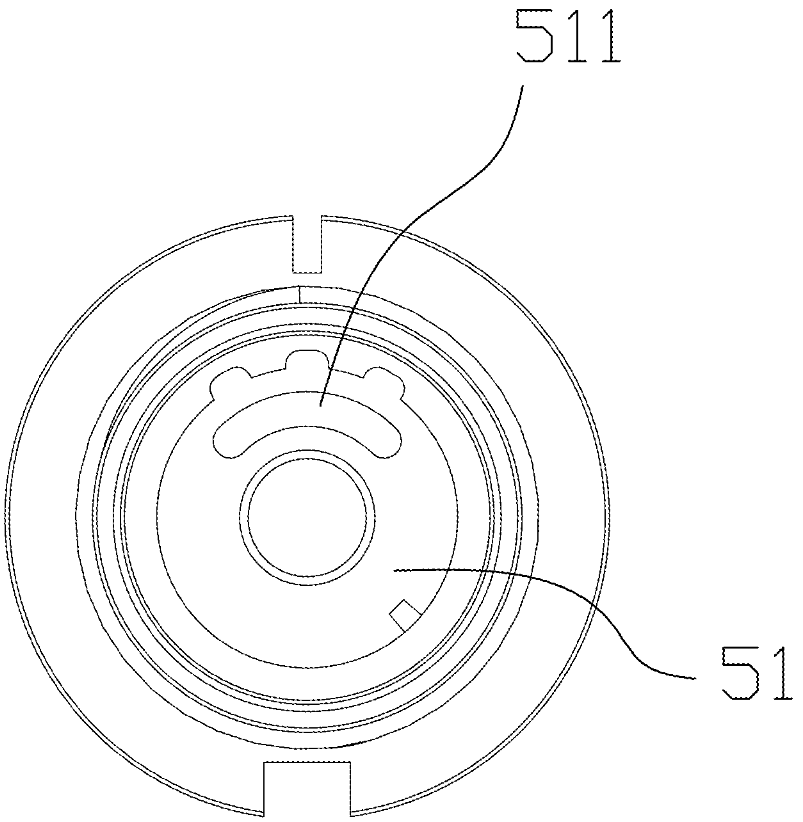
FIG. 9 shows a structural view of a connecting base in FIG. 5.

As is shown in FIGS. 8-9, the connecting base 5 is a cylindrical cavity, a fixed baffle 51 transversely dividing the cavity of the connecting base 5 is arranged in the connecting base 5, and the fixed baffle 51 is made of rubber and is provided with a first through groove 511 penetrating through the fixed baffle 51; a movable baffle 52 is further movably mounted on the connecting base 5, the movable baffle 52 abuts against the fixed baffle 51, and a second through groove 521 is formed in the position, corresponding to the first through groove 511, of the movable baffle 52.

A rotary shaft is further arranged at the center of the movable baffle 52, a mounting hole is formed in the connecting base 5, and the rotary shaft is rotatably mounted in the mounting base 5 through the mounting hole and attached to the fixed baffle 51; a shifting part 522 extending out of the connecting base 5 is further arranged at the tail end of the mounting hole, the rotary shaft is mounted in the connecting base 5, and then the shifting part 522 is arranged on the rotary shaft in a sleeving mode so that the movable baffle 52 can be rotated.

An adjusting gear 6 is further fixed in the housing, a shifting lever 61 is arranged on the adjusting gear 6, the shifting lever 61 is engaged with the shifting part 522 so that the position of the movable baffle 52 can be adjusted by rotating the adjusting gear 6, the overlapping area between the first through groove 511 and the second through groove 521 can be adjusted accordingly, and the flow of the connecting base 5 is adjusted.

As is shown in FIG. 1, an openable cover plate 16 is further arranged at the position, corresponding to the adjusting gear 6, of the housing 1, and the cover plate 16 is made of rubber and can be closed to achieve sealing.

Although the invention is specifically shown and illustrated with the preferred embodiment, those skilled in the field should understand that various changes which can be made in form and in detail of the invention without deviating from the spirit and the scope defined by the claims are all within the protection scope of the invention.

What is claimed is:

1. A flow-adjustable shower unit, comprising:

a water path connector;

a water outlet assembly; and a connecting base;

wherein the connecting base is arranged between the water path connector and the water outlet assembly to make the water path connector communicate with the water outlet assembly;

the connecting base is cylindrical and has a cavity, a fixed baffle is arranged in the connecting base and transversely divides the cavity of the connecting base, and a first through groove is formed in the fixed baffle in a penetrating mode;

a movable baffle is further movably mounted on the connecting base and abuts against the fixed baffle, and a second through groove is further formed so that a position of the second through groove corresponds to a position of the first through groove;

an overlapping area between the first through groove and the second through groove can be adjusted by adjusting the position of the movable baffle, and thus a water flow rate of the connecting base is adjusted;

wherein a rotary shaft is further arranged at a center of the movable baffle, the rotary shaft is rotatably mounted in the connecting base, and the movable baffle rotates relative to the connecting base through the rotary shaft so as to be rotatably adjusted relative to the fixed baffle;

wherein the shower unit further comprises a shifting part extending out of the connecting base, and the shifting part is arranged on the rotary shaft in a sleeving mode so that the movable baffle can be rotated;

wherein the shower unit further comprises a housing, the housing is provided with a mounting cavity having two ends with both ends open, and the water path connector and the water outlet assembly are arranged at the two ends of the mounting cavity of the housing respectively; the connecting base is arranged in the mounting cavity to make the water path connector communicate with the water outlet assembly; an adjusting gear is further arranged in the housing, and the adjusting gear is engaged with the shifting part so that the flow of the connecting base can be adjusted through the adjusting gear.

2. A flow-adjustable shower unit, comprising:

a water path connector;

a water outlet assembly; and a connecting base;

wherein the connecting base is arranged between the water path connector and the water outlet assembly to make the water path connector communicate with the water outlet assembly;

the connecting base is cylindrical and has a cavity, a fixed baffle is arranged in the connecting base and transversely divides the cavity of the connecting base, and a first through groove is formed in the fixed baffle in a penetrating mode;

a movable baffle is further movably mounted on the connecting base and abuts against the fixed baffle, and a second through groove is further formed so that a position of the second through groove corresponds to a position of the first through groove;

an overlapping area between the first through groove and the second through groove can be adjusted by adjusting the position of the movable baffle, and thus a water flow rate of the connecting base is adjusted;

wherein the shower unit further comprises a reversing assembly; the water outlet assembly is provided with a water distribution body, the water distribution body is provided with two or more flow distribution water paths in different water outlet modes, and a water distribution hole corresponding to each flow distribution water path is formed in the water distribution body; the reversing assembly is connected to the water path connector through the connecting base and provided with a water outlet abutting against the water distribution body; the water distribution body is movably mounted relative to the reversing assembly, and the water outlet can communicate with different water distribution holes by moving and/or rotating the water distribution body relative to the reversing assembly; the water distribution holes of the at least two flow distribution water paths are arranged adjacently so that the water outlet can independently communicate with one water distribution hole or can communicate with the at least two adjacent water distribution holes at the same time, and accordingly water can be sprayed out of any flow distribution water path or be sprayed out of the at least two flow distribution water paths at the same time; a sealing element is further arranged between the reversing assembly and the water distribution holes so that when the water outlet partially overlaps with one water distribution hole, the portion, located beyond the coverage area of the water outlet, of the water distribution hole can be sealed.

3. The shower unit according to claim 2, wherein the water distribution body comprises a water distribution pan and an upper cover covering the water distribution pan; the flow distribution water paths are arranged on a side of the water distribution pan facing the upper cover, and the number of the flow distribution water paths is three; the water distribution holes are formed in the upper cover, the number of the water distribution holes is three, and the three water distribution holes correspondingly communicate with the flow distribution water paths respectively; the water outlet of the reversing assembly can abut against the upper cover so as to communicate with the water distribution holes.

4. The shower unit according to claim 2, wherein one end of the connecting base communicates with the water path connector, and the other end of the connecting base is connected to the reversing assembly; the reversing assembly is arranged on the connecting base in a sleeving mode so as to communicate with the water path connector through the connecting base.

5. The shower unit according to claim 4, wherein the reversing assembly is movably connected with the connecting base and can rotate around the connecting base, and all the water distribution holes are located in an arc movement track of the water outlet, so that selection and switching of the flow distribution water paths are achieved.

6. The shower unit according to claim 5, wherein a round insertion groove is formed in one end of the reversing assembly, and the other end of the connecting base connected to the reversing assembly is inserted into the insertion groove, so that the reversing assembly is kept communicating with the water path connector in the rotating process; the insertion groove communicates with the water outlet.

* * * * *